(12) United States Patent
Gilra et al.

(10) Patent No.: US 8,743,053 B2
(45) Date of Patent: Jun. 3, 2014

(54) RESTRICTING CURSOR MOVEMENT TO TRACK AN EXISTING PATH

(75) Inventors: Anant Gilra, Bangalore (IN); Ashish Duggal, Delhi (IN)

(73) Assignee: Adobe Systems Incorporation, San Jose, CA (US)

( * ) Notice: Subject to any disclaimer, the term of this patent is extended or adjusted under 35 U.S.C. 154(b) by 987 days.

(21) Appl. No.: 12/550,871

(22) Filed: Aug. 31, 2009

(65) Prior Publication Data

US 2013/0120248 A1    May 16, 2013

(51) Int. Cl.
*G09G 5/08* (2006.01)

(52) U.S. Cl.
USPC .......................................................... 345/157

(58) Field of Classification Search
None
See application file for complete search history.

(56) References Cited

U.S. PATENT DOCUMENTS

| | | | |
|---|---|---|---|
| 5,477,236 A | 12/1995 | Nanbu | |
| 6,342,877 B1 | 1/2002 | Nikom | |
| 7,240,299 B2* | 7/2007 | Abrams | 715/857 |
| 7,619,616 B2* | 11/2009 | Rimas Ribikauskas et al. | 345/173 |
| 7,730,430 B2* | 6/2010 | Baudisch et al. | 715/857 |
| 2007/0146325 A1* | 6/2007 | Poston et al. | 345/163 |
| 2013/0127915 A1* | 5/2013 | Gilra | 345/660 |

* cited by examiner

*Primary Examiner* — Joseph Haley
*Assistant Examiner* — Emily Frank
(74) *Attorney, Agent, or Firm* — Wolfe-SBMC

(57) ABSTRACT

Systems and methods are presented for applying visual effects while in a mode that restricts cursor movement to track an existing path. While in cursor path restriction mode, spatial inputs may be received from a pointing device configured to control a cursor on a display, with the spatial inputs signaling positions on the display. The cursor moves on a restricted path that tracks an existing path in response to the spatial signals, with the cursor confined to the restricted path even when spatial signals may indicate a point not on the restricted path. During the cursor movement, in addition to the movement of the cursor, there may be an alteration of what appears on the display, where the alteration depends on movement of the cursor along at least a portion of the restricted path.

20 Claims, 13 Drawing Sheets

RESTRICTING CURSOR MOVEMENT TO TRACK AN EXISTING PATH

BACKGROUND

Artists, illustrators, cartoonists, photographers, and other creative individuals often use computers rather than traditional media, employing graphic art software to access, create, and edit graphic files. Their work frequently includes operations involving paths or path-like elements displayed on a viewing area. Typical operations may require application of visual effects such as brush strokes and patterns. In addition to creating and applying new visual effects to paths, an artist may need to derive some visual elements from existing ones, or to retouch, blend, mix, augment, replace, patch, remove, or replicate various effects.

An artist or illustrator may want to apply strokes or patterns or other visual effects to an existing path appearing on the viewing area of a display, or relative to a path which tracks such an existing path. Application of certain effects may require guiding a cursor using a pointing device so that the cursor accurately tracks an existing path. Manipulation of a pointing device to make a cursor track an existing path precisely can require concentration coupled with fine motor control. Maintaining such fine control of a pointing device can divert the artist's energies from essential creative aspects of a task. Accuracy can deteriorate over time as the operator of a pointing device tires. Even the most able practitioner may produce errors which require subsequent correction, resulting in lost time and perhaps frustration.

Application of visual effects may depend on tracking all or part of an existing path, or on precisely excising or selecting a portion of an existing path. Application of some visual effects can necessitate disassembling an existing path into various components, operating on each of the components, and then reassembling them in order to achieve a result based upon characteristics of the existing path, including visual features already present on the existing path. Such serial decomposition and assembly by repeated selection, cutting, and pasting, sometimes involving several different modes of operation, can be unnecessarily frustrating, tedious, distracting, fatiguing, time-consuming, laborious, or inefficient.

SUMMARY

Various embodiments of systems and methods for operating in a cursor path restriction mode that restricts movement of a cursor are disclosed. In one embodiment, a method may include a computer receiving input to enter a cursor path restriction mode. While in the cursor path restriction mode, spatial inputs from a pointing device configured to control a cursor on a display may be received, where the spatial inputs signal positions on the display. While in cursor path restriction mode, the cursor may be moved in response to the received spatial inputs so that the cursor moves on a restricted path that tracks an existing path displayed on the display, such that whenever the spatial inputs signal a position not on the restricted path, movement of the cursor remains confined to the restricted path. During the moving of the cursor in cursor path restriction mode, in addition to showing movement of the cursor, there may be an altering of what is displayed on the display, where the altering depends on movement of the cursor along at least a portion of the restricted path.

In one embodiment, a memory is coupled to a processor, and the memory stores program instructions executable by the processor to implement a cursor path restriction module configured to receive input to enter a cursor path restriction mode. While in cursor path restriction mode, the cursor path restriction module may receive spatial inputs from a pointing device configured to control a cursor on a display, where the spatial inputs signal positions on the display. While in cursor path restriction mode, the cursor path restriction module may move the cursor in response to the received spatial inputs so that the cursor moves on a restricted path that tracks an existing path displayed on the display, such that whenever the spatial inputs signal a position not on the restricted path, movement of the cursor remains confined to the restricted path. During the moving of the cursor in cursor path restriction mode, the cursor path restriction module may, in addition to showing movement of the cursor, alter what is displayed on the display, where the altering is dependent upon movement of the cursor along at least a portion of the restricted path.

Further embodiments of systems and methods for operating in a cursor path restriction mode that restricts movement of a cursor are disclosed. In one embodiment, the system may include a computer-readable storage medium storing program instructions that are computer-executable to perform receiving input to enter a cursor path restriction mode. The program instructions are further executable to perform, while in cursor path restriction mode, receiving spatial inputs from a pointing device configured to control a cursor on a display, where the spatial inputs signal positions on the display. The program instructions are further executable to perform, while in cursor path restriction mode, moving the cursor in response to the received spatial inputs so that the cursor moves on a restricted path that tracks an existing path displayed on the display, such that whenever the spatial inputs signal a position not on the restricted path, movement of the cursor remains confined to the restricted path. The program instructions are further executable to perform, during the moving of the cursor in cursor path restriction mode, and in addition to showing movement of the cursor, altering what is displayed on the display, wherein said altering is dependent upon movement of the cursor along at least a portion of the restricted path.

Figure 1A:
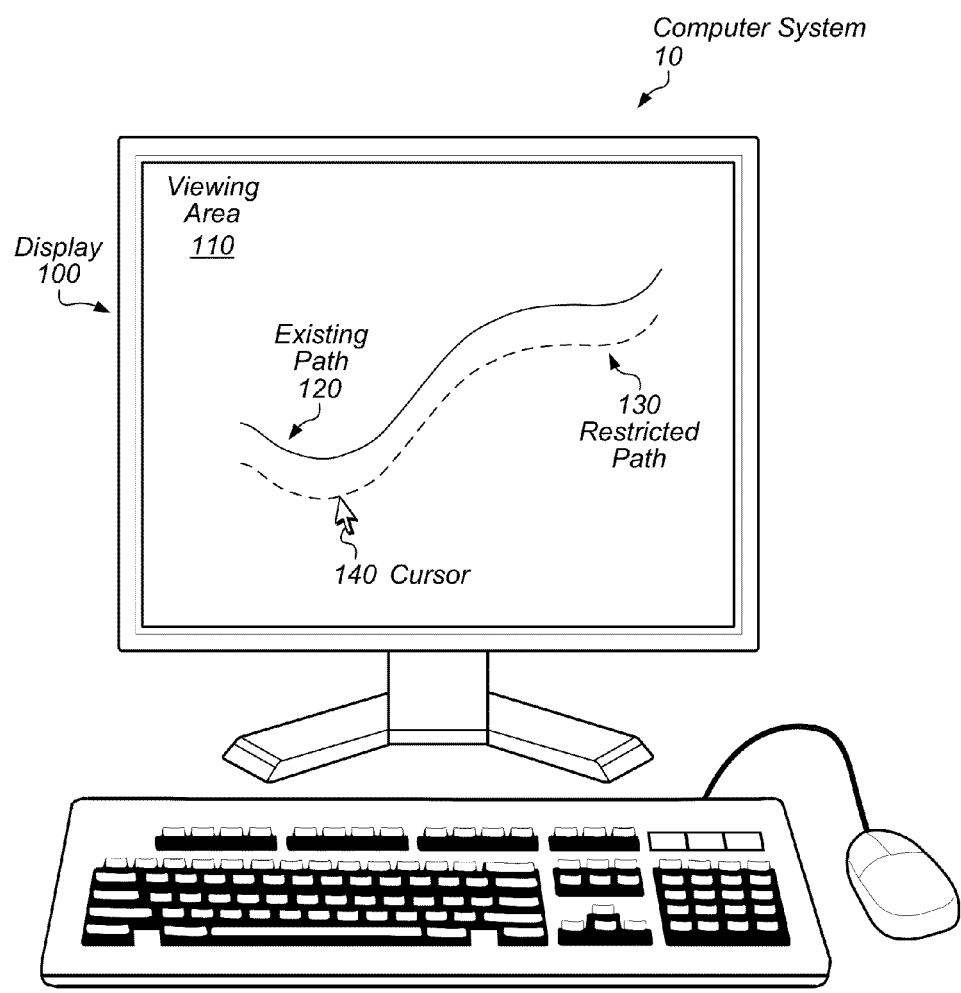
FIG. 1A illustrates one embodiment of a computer system configured to operate in a cursor path restriction mode, where a restricted path tracking an existing path shown on the display is different from the existing path.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

In the following discussion, various embodiments of systems and methods for applying visual effects while operating in a cursor path restriction mode are explored. In particular, there is a detailed description of operations for a mode in which a cursor is forced to track an existing path, and of producing visual effects in a continuous mode dependent upon signals received during the cursor's traversal of the existing path. There is a discussion of various techniques facilitating easy and convenient application of multiple different visual effects while operating continuously in a mode that forces the cursor to track existing paths. Finally, an exemplary computer system embodiment that may be employed to implement aspects of the cursor path restriction mode is described.

Applying a Mode that Restricts Cursor Movement to Track an Existing Path

FIGS. 1A-1D illustrate several example embodiments of a computer system for applying a mode that restricts cursor movement to track an existing path on a display. In each of the illustrated embodiments, computer system 10 (or simply, system 10) includes a display 100. Display 100 includes a viewing area 110 that displays an existing path 120, a restricted path 130, and a cursor 140. Existing path 120 appears as a solid curve, and restricted path 130 appears as a dotted-line curve. Restricted path 130 is the path along which cursor 140 moves while limited by constraints imposed in cursor path restriction mode. While operating in cursor path restriction mode, cursor 140 adheres to restricted path 130 even when spatial inputs received from the pointing device indicate a position on viewing area 110 that is not on restricted path 130.

Generally speaking, computer system 10 may correspond to any suitable type of computer system configured to execute applications. For example, computer system 10 may correspond to a desktop computer system, a laptop, netbook or notebook computer, a handheld computing device such as a personal digital assistant, cellular phone, media player, or combination device, or any other suitable type of device. In various embodiments, computer system 10 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, or similar device, and may also include an image scanner or web cam for image or video input. According to various embodiments, a component of an input system may serve as a pointing device. Such a pointing component may be embodied as a mouse, as illustrated in FIG. 1A, or as a trackball, touchpad, graphics table stylus, touch screen, joystick, pointing stick, light pen, directional pad, keyboard, eye tracking device, gesture signaling device, or similar input device. Output systems may variously include a video subsystem including a video monitor or other display device, an audio subsystem, or other types of output devices. In some embodiments, computer system 10 may be configured to execute one or more operating systems, such as Microsoft Windows™, Apple MacOS™, Linux™, or any other suitable operating systems.

In various embodiments, the stream of spatial inputs being received from the pointing device is only one of the factors used in determining how cursor 140 moves along restricted path 130. The location of restricted path 130 on viewing area 110 and the shape of restricted path 130 may also be used in determining how cursor 140 proceeds along restricted path 130. According to numerous embodiments, various other factors may contribute to a determining how cursor 140 proceeds along restricted path 130. For example, cursor acceleration parameters may play a part in establishing the manner in which cursor 140 traverses restricted path 130. As another example, operations which occur while cursor 140 is moving on restricted path 130 may affect calculations governing movement of cursor 140 along restricted path 130. For instance, a user may depress a mouse button to apply a painting stroke while moving cursor 140 along restricted path 130. In some such instances, during the time the mouse button remains depressed, the system may constrain cursor 140 to move at a relatively constant speed, but after the button is released, cursor 140 may be free to vary its speed as it travels restricted path 130. Regardless of which collection of factors is involved in controlling the passage of cursor 140 along restricted path 130 according to the various embodiments, cursor 140 does not deviate from restricted path 130 as long as cursor 140 is subject to the constraints imposed by operating in cursor path restriction mode.

Figure 1B:
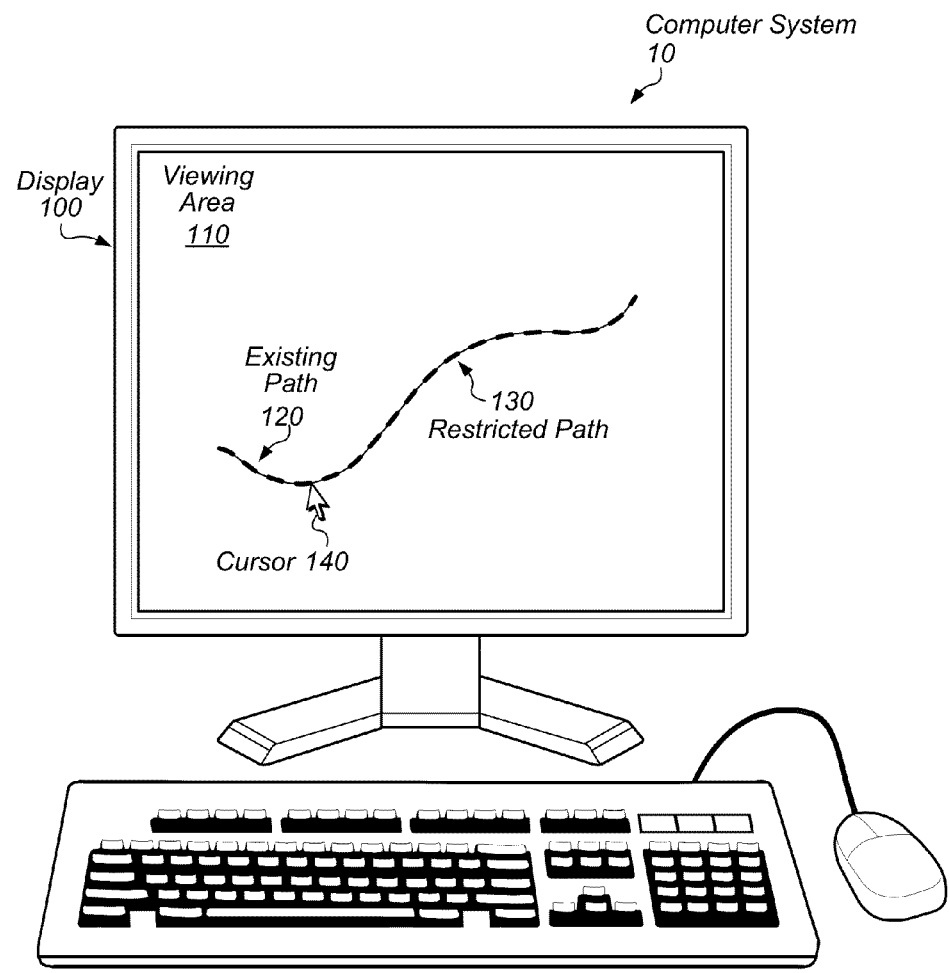
FIG. 1B illustrates one embodiment of a computer system configured to operate in a cursor path restriction mode, where a restricted path tracking an existing path shown on the display coincides with the existing path.
Figure 1C:
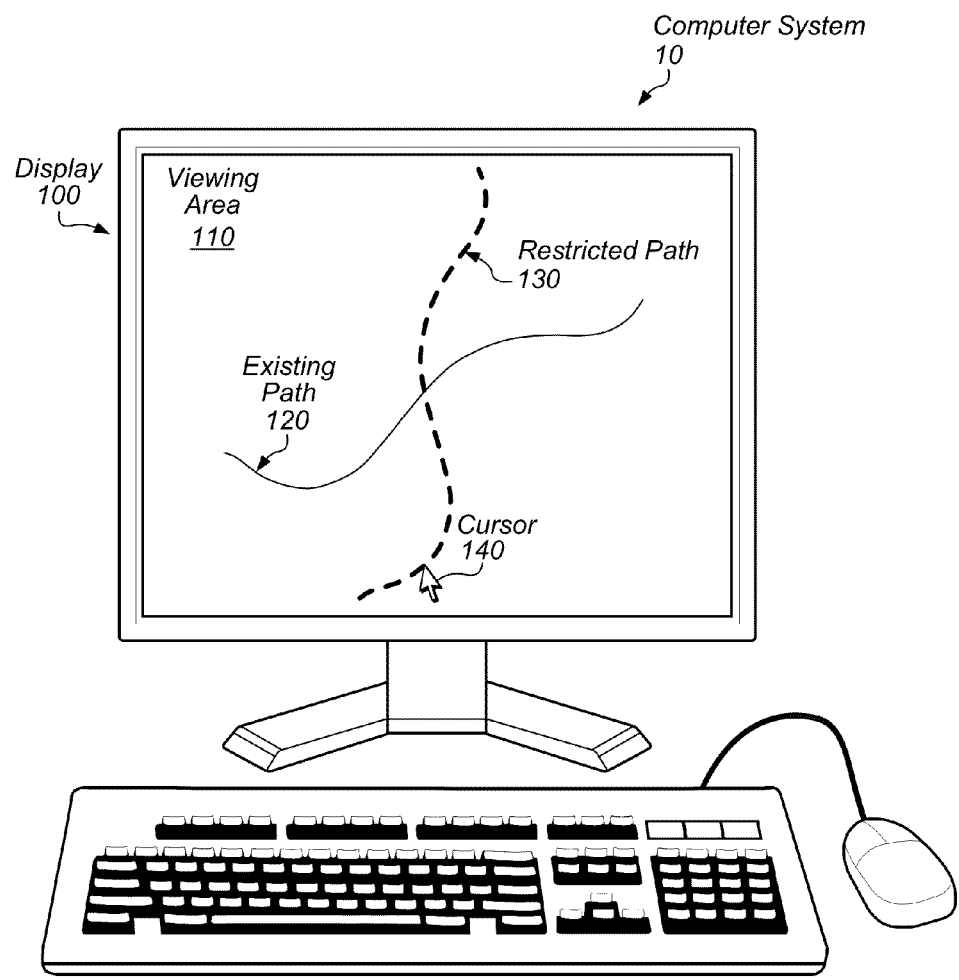
FIG. 1C illustrates one embodiment of a computer system configured to operate in a cursor path restriction mode, where a restricted path tracking an existing path shown on the display is a rotation and translation of the existing path.
Figure 1D:
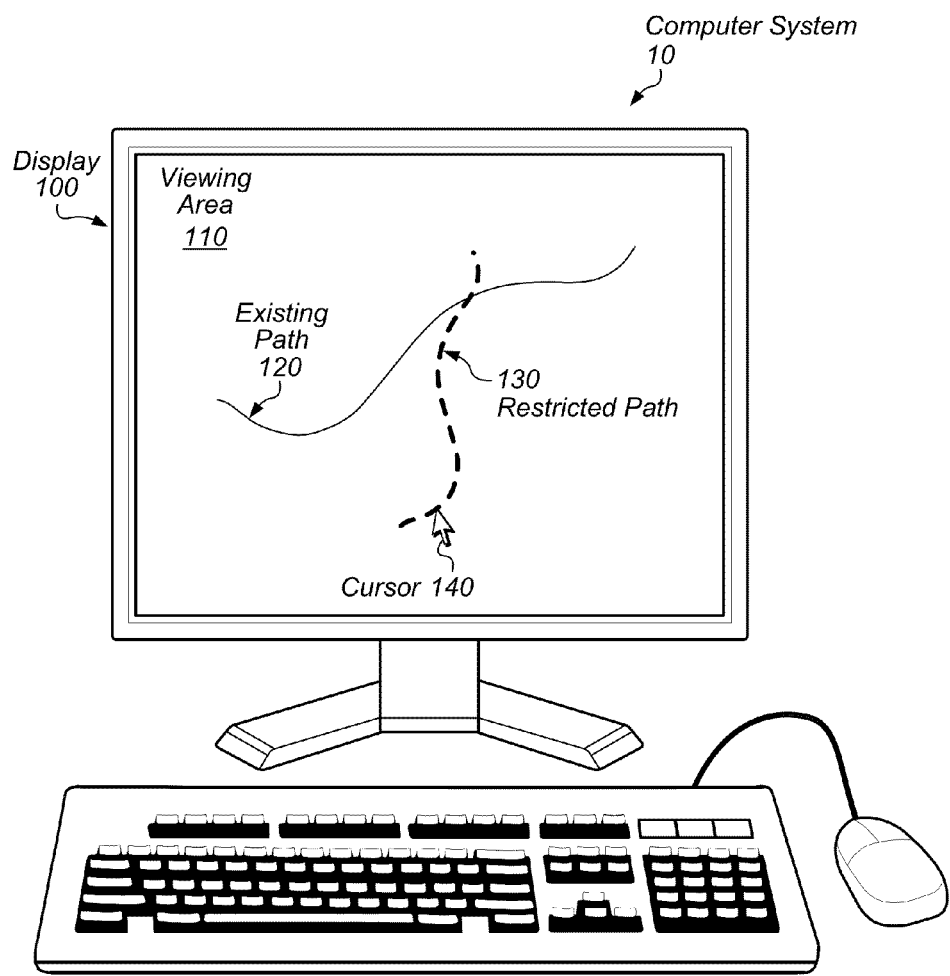
FIG. 1D illustrates one embodiment of a computer system configured to operate in a cursor path restriction mode, where a restricted path tracking an existing path shown on the display is a rotated, translated, scaled version of the existing path.

In each of the embodiments illustrated in FIGS. 1A-1D, restricted path 130 tracks existing path 120. For example, in FIG. 1A, restricted path 130 is shown as a downward translation of existing path 120. In FIG. 1B, restricted path 130 coincides exactly with existing path 120. FIG. 1C illustrates an embodiment in which restricted path 130 represents a rotation and translation of existing path 120. FIG. 1D shows an instance in which restricted path 130 is a rotated, translated, and scaled version of existing path 120. In each of these embodiments, and in various other embodiments, restricted path 130 tracks existing path 120.

FIGS. 1A-1D show only a single existing path 120 and restricted path 130, but according to other embodiments, there may be a multiplicity of existing paths 120 and corresponding restricted paths 130 which track their respective existing paths 120. During operations in cursor path restriction mode, several different existing paths 120 may be currently selected over the course of time, so that at one particular time, one existing path 120 may be currently selected, while at another particular time, a different existing path 120 may be currently selected. Given a particular existing path 120 that is currently selected, a corresponding current restricted path 130 tracks the particular currently selected existing path 120.

Existing path 120 is shown as a single, continuous curve in FIGS. 1A-1D. In other embodiments, existing path 120 may consist of discrete pieces which are not connected to each other, so that the corresponding restricted path 130 is also a collection of discrete pieces which are not connected to each other. In such embodiments, cursor 140 may jump from one piece of restricted path 130 to another piece of restricted path 130 as it moves along restricted path 130. In other words, while operating in cursor path restriction mode, cursor 140 may move along a particular piece of a restricted path 130 that contains several discrete pieces which are not connected to each other, and cursor 140 may subsequently move along another particular piece of the same restricted path 130. When operating in cursor path restriction mode while traversing such a restricted path 130 containing several discrete pieces which are not connected to each other, cursor 140 remains confined to the several discrete pieces of restricted path 130.

In other embodiments, existing path 120 may consist of discrete pieces which are not connected to each other, and restricted path 130 may be formed by joining together the discrete pieces of existing path 120 to form a new continuous path.

In the embodiments illustrated in FIGS. 1A-1D, a stream of spatial inputs arrives from a pointing device configured to control cursor 140 as it moves along restricted path 130. The stream of spatial input signals indicate positions on viewing area 110 of display 100. While operating in cursor path restriction mode, the stream of spatial inputs received from the pointing device is used to determine how cursor 140 moves along restricted path 130. Such determinations of movement of cursor 140 vary according to numerous embodiments. By controlling the spatial inputs emitted by the pointing device, cursor 140 may be moved to various positions on restricted path 130. For example, in some embodiments, spatial inputs indicating higher locations on viewing area 110 of display 100 may cause cursor 140 to move higher on restricted path 130, while spatial inputs indicating lower locations on viewing area 110 of display 100 may cause cursor 140 to move lower on restricted path 130. Similarly, spatial inputs indicating rightward travel on viewing area 110 of display 100 may cause cursor 140 to move rightward on restricted path 130, while spatial inputs indicating leftward travel on viewing area 110 of display 100 may cause cursor 140 to move leftward on restricted path 130. As another example, spatial inputs indicating acceleration through locations on viewing area 110 of display 100 may force cursor 140 to accelerate its movement along restricted path 130, while spatial inputs indicating deceleration through locations on viewing area 110 of display 100 may force cursor 140 to decelerate its movement along restricted path 130.

While cursor 140 moves on restricted path 130 in cursor path restriction mode, in addition to the display on viewing area 110 of the visible movement of cursor 140, there may be other visible alteration of the content of viewing area 110, where the visible alteration depends upon the movement of cursor 140 along at least a portion of the restricted path. For example, while cursor 140 proceeds along some portion of restricted path 130 in cursor path restriction mode, additional signals may arrive from the pointing device, or from another source of input, to initiate a change to the visible content appearing on viewing area 110, where the change to the visible content derives from the movement of cursor 140 along the portion of restricted path 130. For instance, when the pointing device is embodied as a mouse, a user may move the mouse to make cursor 140 travel along restricted path 130 while in cursor path restriction mode, and the user may, while moving the mouse, simultaneously depress a mouse button in order to paint a portion of restricted path 130. Actions that change the visible content appearing on viewing area 110 while cursor 140 moves in cursor path restriction mode are described on detail in the following paragraphs.

Figure 2:
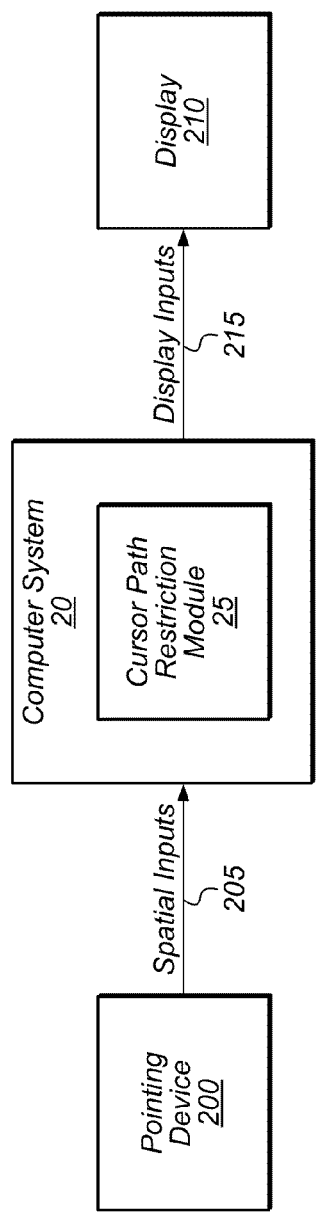
FIG. 2 is a block diagram illustrating one embodiment of an architecture that may be configured to implement various features of the systems illustrated in FIGS. 1A-1D.

FIG. 2 illustrates one embodiment of an architecture that may be configured to implement various features of the systems illustrated in FIGS. 1A-1D. In the illustrated embodiment, computer system 20 is configured to receive spatial inputs 205 from pointing device 200, and spatial inputs 205 are configured to control a cursor viewable on display 210 via signals indicating positions on display 210. Computer system 20 is configured to process received spatial inputs 205, and in response, to send display inputs 215 to display 210. Display inputs 215 may provide signals controlling movement of a cursor across the viewing area of display 210. For example, cursor 140 of FIGS. 1A-1D may move across viewing area 110 of display 100 in response to display inputs received from computer system 10.

FIG. 2 also shows a cursor path restriction module 25. In the illustrated embodiment, computer system 20 is configured to receive input to enter a cursor path restriction mode, and cursor path restriction module 25 operates to provide cursor path restriction functionality while computer system 20 is running in cursor path restriction mode. It is noted that in various embodiments, cursor path restriction module 25 may be implemented in hardware, in software, or in a combination of software and hardware. It is contemplated that according to various embodiments, the features of cursor path restriction module 25 may be implemented, in whole or in part, as a software component of an application or library or operating system or device driver, and that such a software component may exist within, or partially within computer system 20 and/or peripheral devices such as pointing device 200 and display 210. It is further contemplated that according to various embodiments, the features of cursor path restriction module 25 may be implemented, in whole or in part, as, as a hardware component of a device such as pointing device 200, display 210, or computer system 20. For example, some functionality for cursor path restriction may be embodied in a software application by means of an application programming interface (API) for a software library incorporating elements that facilitate cursor path restriction functionality. In other embodiments, functionality for cursor path restriction may be directly encoded within an application without resorting to a special software library. In still other embodiments, an operating system may itself provide direct functionality for entering, operating in, and exiting a cursor path restriction mode. In yet other embodiments, an operating system may supply indirect support for entering, operating in, and exiting a cursor path restriction mode by means of a loadable system library.

Cursor path restriction module 25 may be configured to intercept or transmit input to enter or to exit cursor path restriction mode. For embodiments in which a software application fully incorporates cursor path restriction module 25, interception of a signal to enter or to exit cursor path restriction mode may correspondingly commence or terminate operation of the software application in cursor path restriction mode. For example, a computer graphics application or graphic art software may include cursor path restriction module 25, and may be configured to begin or end operation in a cursor path restriction mode upon intercepting a signal to enter or to exit cursor path restriction mode.

A variety of methods for signaling the entering or exiting of cursor path restriction mode may be implemented by cursor path restriction module 25, according to the embodiments. In some embodiments, a keystroke or combination of keystrokes may be used to signal entrance to or exit from a cursor path restriction mode. Such a keystroke or combination of keystrokes may trigger cursor path restriction functionality in a software application, operating system, device driver, or other software component of computer system 20, or it may toggle cursor path restriction functionality in a hardware portion of a device such as pointing device 200, display 210, or computer system 20. According to other embodiments, entering or exiting cursor path restriction mode may be accomplished by touching a touch screen or tablet with a finger, brush, stylus, or other object. In other embodiments, the means of signaling may be less direct. For example, a user may employ another device or system, such as a laser pointer, a remotely-controlled pointing device, or a separate computer system. In various embodiments, cursor path restriction module 25 may implement a system for detection of touch, gestures, light patterns, electronic pulses, or other means of signaling.

According to some embodiments, signals from pointing device 200 may be interpreted as indications to enter or exit cursor path restriction mode. For example, while operating in a normal cursor mode (i.e., a standard mode in which movement of the cursor is defined by spatial inputs received from a pointing device), spatial inputs 205 received from pointing device 200 may themselves indicate that cursor path restriction module 25 should commence operations in cursor path restriction mode. In response, cursor path restriction module 25 may impose constraints upon the movement of a cursor on the viewing area of display 210. As illustrated in FIGS. 1A-1D, while operating in cursor path restriction mode, cursor 140 adheres to a restricted path 130 even when spatial inputs received from the pointing device 200 indicate a position on viewing area 110 that is not on restricted path 130. In one embodiment, while operating in a normal cursor mode, a user may cause pointing device 200 to signal entrance into cursor path restriction mode by placing cursor 140 within a distance envelope of an existing path 120, or by placing cursor 140 on an existing path 120 and clicking a button on pointing device 200. According to other embodiments, other pointing device gestures, or pointing device clicks, or combinations of the two may be used to signal entrance into cursor path restriction mode. In some embodiments, a graphical user interface element may be provided to enter cursor path restriction mode.

As another particular example, spatial inputs 205 issuing from pointing device 200 while operating in cursor path restriction mode may signal a desire to exit cursor path restriction mode and return to a normal cursor mode (a standard mode in which movement of the cursor is defined by spatial inputs received from a pointing device). Spatial inputs 205 may signal such a desire by indicating an intention to move cursor 140 away from restricted path 130 at a slope larger than a threshold amount. For instance, a threshold angle may be set at, e.g., 60 degrees, so that whenever spatial inputs 205 emanating from pointing device 200 indicate a desire to make cursor 140 move at more than 60 degrees deviation from the direction of a line tangent to restricted path 130, then cursor path restriction module 25 may relinquish control over cursor 140 and return cursor 140 to a normal cursor mode. In other similar instances, a threshold angle might be set at 80 degrees, or at some other angle.

In general, any of a wide variety of signals input to computer system 20 may serve to indicate a desire to leave normal cursor mode and enter cursor path restriction mode, or vice versa. According to some embodiments, the operating system itself may commence or terminate operation in cursor path restriction mode based upon interception of a signal to enter or to exit cursor path restriction mode, whereas in other embodiments, a software application or a device driver may commence or terminate operation in cursor path restriction mode based upon interception of a signal to enter or to exit cursor path restriction mode. In some embodiments, a hardware component of a device such as pointing device 200, display 210, or computer system 20 may commence or terminate operation in cursor path restriction mode based upon detecting a signal to enter or to exit cursor path restriction mode.

After entering cursor path restriction mode, cursor path restriction module 25 may check to see if an existing path 120 has been selected to serve as a currently selected existing path 120. If no existing path 120 has been selected, then cursor path restriction module 25 may indicate the need to select an existing path 120 displayed on display 210. In some embodiments, selection of an existing path 120 may be left to a user, and cursor path restriction module 25 may issue a signal to the user that the user should select an existing path 120. In such embodiments, the user may select from one or more existing paths 120. User selection of an existing path 120 may be accomplished by any standard method for selecting an object. For example, the user may select an existing path 120 by drawing a box around a portion of existing path 120, or by placing cursor 140 within a threshold distance of an existing path 120, or by touching an existing path 120, or by any other means for selecting an object.

In other embodiments, selection of an existing path 120 may be made automatically by cursor path restriction module 25 according to preset criteria, or according to the current state of a collection of system variables. For example, cursor path restriction module 25 may refer to a data store indicating the most recently selected existing path 120, and may automatically reselect the most recently selected existing path 120 as the currently selected existing path 120. As another example, cursor path restriction module 25 may refer to a data store indicating a current priority listing of existing paths 120, and may select the one having the highest priority, or the one having the lowest priority. As yet another example, cursor path restriction module 25 may ascertain the state of various objects currently shown on display 210, and may calculate geometric relationships among the various objects as a basis for selecting an existing path 120. For instance, existing paths 120 displayed on display 210 may have different colors, and cursor path restriction module 25 may locate a, e.g., red existing path 120 that is nearest to cursor 140 as the currently selected existing path 120. In other embodiments, cursor path restriction module 25 may select the nearest path as the current existing path. In other embodiments, cursor path restriction module 25 may allow the cursor to operate in normal cursor mode until the cursor is moved within a certain proximity of an existing path, at which time the cursor path restriction module 25 will apply the cursor path restriction mode and select the existing path. According to various embodiments, selection of an existing path 120 may be made by any of a wide variety of known selection methods.

Once an existing path 120 has been selected, then a restricted path 130 may be variously determined, according to the various embodiments, to track a selected existing path 120. FIGS. 1A-1D illustrate some embodiments of a restricted path 130 that tracks a selected existing path 120.

As illustrated in the type of embodiment shown in FIG. 1A, a restricted path 130 that tracks a selected existing path 120 may be defined as a simple translation of existing path 120 to a different location on viewing area 110. Such a translation of a selected existing path 120 may be manually controlled by an operator using an appliance such as a mouse or a keyboard to define a location to which selected existing path 120 may be translated. According to other embodiments, a translation of a selected existing path 120 may be made automatically by cursor path restriction module 25 based upon preset or current translation parameters. In some embodiments, cursor path restriction module 25 may decide to automatically define restricted path 130 as a translation of a selected existing path 120 based upon the current state of a collection of system variables.

FIG. 1B illustrates an embodiment in which the restricted path 130 is chosen to be the same as a selected existing path 120. Cursor path restriction module 25 may determine restricted path 130 to be the same as selected existing path 120 based upon operator choice, or upon preset or current parameters for defining a restricted path 130. Cursor path restriction module 25 may also, according to some embodiments, decide to define restricted path 130 to be the same as a selected existing path 120 based upon the current state of a collection of system variables.

FIG. 1C illustrates an embodiment in which restricted path 130 is defined as a rotation and translation of existing path 120 on viewing area 110. An operator may manually define the degree of rotation and an amount of translation through direct input using an appliance such as a mouse or a keyboard. In other embodiments, an operator may simply select from among preset parameters to define a degree of rotation and an amount of translation to apply to selected existing path 120 in determining restricted path 130. According to some embodiments, cursor path restriction module 25 automatically sets a degree of rotation and extent of translation to apply to existing path 120 based upon preset or current parameters for defining a restricted path 130, or upon the current state of a collection of system variables.

FIG. 1D illustrates an embodiment in which restricted path 130 is defined as a rotation, translation and scaling of existing path 120 on viewing area 110. An operator may manually define a degree of rotation, an amount of translation, and scaling factor through direct input using an appliance such as a mouse or a keyboard. In other embodiments, an operator may simply select from among preset parameters to define a degree of rotation, an extent of translation, and a scaling factor to apply to selected existing path 120 in defining restricted path 130. According to some embodiments, cursor path restriction module 25 automatically sets a degree of rotation, extent of translation, and a scaling factor to apply to existing path 120 based upon preset or current parameters for defining a restricted path 130, or upon the current state of a collection of system variables.

A restricted path 130 may be variously defined to track a selected existing path 120, according to the embodiments. Once a restricted path 130 has been determined to track a selected existing path 120, cursor path restriction module 25 imposes constraints to limit the movement of cursor 140 to the current restricted path 130 while operating in cursor path restriction mode. While functioning in cursor path restriction mode, cursor path restriction module 25 may receive or generate an indication that a different existing path 120 has been selected as the new currently selected existing path 120. In response to such an indication, cursor path restriction module 25 may define a new current restricted path 120 to track the newly selected current existing path 120. While operations proceed in cursor path restriction mode, several different existing paths 120 may be selected over the course of time, so that at one particular time, one existing path 120 may be currently selected, while at another particular time, a different existing path 120 may be currently selected. Given a particular existing path 120 that is currently selected, a corresponding current restricted path 130 tracks the particular currently selected existing path 120. Movement of cursor 140 is confined to the currently selected existing path 120 while in cursor path restriction mode.

While functioning in cursor path restriction mode, computer system 20 may receive spatial inputs 205 issuing from pointing device 200. Cursor path restriction module 25 may use received spatial inputs 205, which signal positions on display 210, to determine how cursor 140 moves along current restricted path 130 on viewing area 110. The relationship between a received stream of spatial inputs 205 and responsive movement of cursor 140 on current restricted path 130 varies according to various embodiments of cursor path restriction module 25.

For example, cursor path restriction module 25 may be configured to move cursor 140 from a point A of current restricted path 130 to a point B of current restricted path 130 whenever received spatial inputs 205 indicate a current point P on viewing area 110 of display 100 such that current point P is closer to point B than to point A, according to a distance metric applied to viewing area 110. Cursor path restriction module 25 may, in other embodiments, be configured to optimize another measure taken between current restricted path 130 and a point or path on viewing area 110 that is currently indicated by received spatial inputs 205, where the other measure depends upon a metric applied to viewing area 110.

In some instances, a change in position, as indicated by received spatial inputs 205, may be ignored, so that cursor 140 remains in a fixed position, even though received spatial inputs 205 signal a change in location on viewing area 110. For example, if received spatial inputs 205 indicate movement along a line orthogonal to current restricted path 130, then cursor path restriction module 25 may maintain cursor 140 at its present location.

In some embodiments, if received spatial inputs 205 signal movement to a location on viewing area 110 that is outside an envelope surrounding current restricted path 130, then cursor path restriction module 25 will exit cursor path restriction mode, and enter normal cursor mode. In other embodiments, cursor path restriction module 25 will maintain cursor path restriction mode operation no matter what positions or movements on viewing area 110 are signaled by received spatial inputs 205.

Speed, acceleration, deceleration, and other dynamic characteristics of the movement of cursor 140 on restricted path 130 during operation in cursor path restriction mode may be calculated by cursor path restriction module 25 according to indications received from spatial inputs 205. In some embodiments, factors other than spatial inputs 205 may be incorporated in calculation of dynamic characteristics of cursor 140 as it moves along restricted path 130 in response to the received stream of spatial inputs 205. For example, an operator or a parameter may signal an intention that cursor 140 to be restrained from rapidly accelerating or decelerating during application of a painting stroke while cursor 140 moves along restricted path 130 in cursor path restriction mode. In such an instance, cursor path restriction module 25 may calculate a moving average speed based upon the received stream of spatial inputs 205, and restrain cursor 140 from rapidly accelerating or decelerating from the moving average speed. In other instances, cursor path restriction module 25 may use predictive techniques to anticipate desired movement of cursor 140 along restricted path 130, and may cause cursor 140 to move in the anticipated manner in advance of processing spatial signals 205 that signal actual desired movement of cursor 140 along restricted path 130. If actual desired movement of cursor 140 deviates beyond a threshold amount from anticipated desired movement of cursor 140, then cursor path restriction module 25 may make corrections to the movement of cursor 140 along restricted path 130.

According to various embodiments, cursor path restriction module 25 may interact with pointing device 200 via device drivers or other system services that may be provided by an operating system such as Microsoft Windows™, Apple MacOS™, Linux™, or any other suitable operating system. For example, when in the cursor path restriction mode, cursor path restriction module 25 may interact with a cursor control API (application programming interface) provided by an operating system to alter or override the cursor position so that the cursor stays on the restricted path.

A large variety of parameters may be generated, set, or received to configure the operation of cursor path restriction module 25, according to numerous embodiments. For example, there may be parameters governing exiting cursor path restriction mode. For instance, a threshold angle may be set to a value x, such that whenever spatial inputs 205 emanating from pointing device 200 indicate a desire to make cursor 140 move at more than x degrees deviation from the direction of a line tangent to restricted path 130, then cursor path restriction module 25 may relinquish control over cursor 140 and return control of cursor 140 to a normal cursor mode. Another such exit parameter may establish the width of an envelope straddling current restricted path 130, such that if received spatial inputs 205 signal movement to a location that is outside the envelope surrounding current restricted path 130, then cursor path restriction module 25 will exit cursor path restriction mode, and enter normal cursor mode.

Other configuration parameters for cursor path restriction module 25 may include ones defining a degree of rotation, an amount of translation, and scaling factor to be applied by cursor path restriction module 25 to currently selected existing path 120 in determining the current restricted path 130. Parameters governing such dynamic characteristics as speed, acceleration, and deceleration of movement of cursor 140 may also be set, according to some embodiments. Parameters imposing a metric for use in calculations made by cursor path restriction module 25 may also be set for certain embodiments. Parameters governing visible alteration of the content of viewing area 110 based upon movement of cursor 140 along restricted path 130 may also be arranged, according to various embodiments. The parameters described here are given as example parameters for example embodiments, and are not meant to limit the number or type of parameters related to operation of cursor path restriction module 25.

While operating in cursor path restriction mode, aside from displaying on viewing area 110 the visible movement of cursor 140, cursor path restriction module 25 may also be configured to visibly alter the content of viewing area 110 dependent upon movement of cursor 140 along at least a portion of restricted path 130. For example, cursor path restriction module 25 may be so configured that, if an operator holds down a button of pointing device 200 while simultaneously moving cursor 140 along a portion of restricted path 130, then cursor path restriction module 25 may respond by applying a colored stroke or pattern to the traversed portion of restricted path 130 while the button is held down by the operator. When the operator releases the button, cursor path restriction module 25 may cease application of the colored stroke or pattern to restricted path 130. According to a variety of embodiments, the manner in which cursor path restriction module 25 visibly alters content of the viewing area 110 dependent upon movement of cursor 140 along a portion of restricted path 130 may vary widely. A further discussion of various such alterations is discussed below.

Figure 3A:
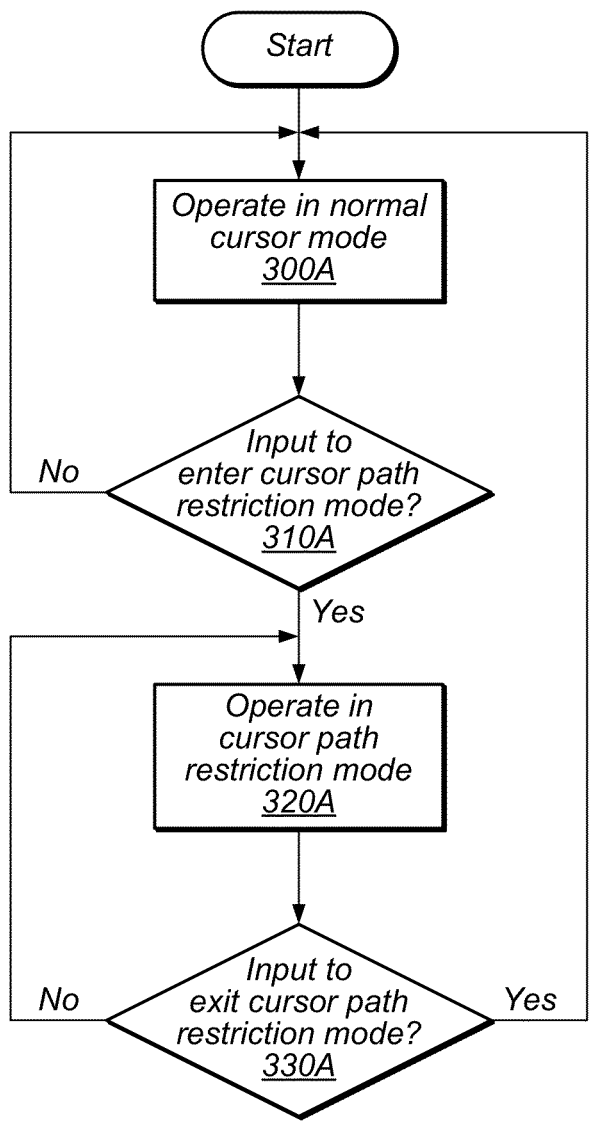
FIG. 3A is a flow diagram illustrating one embodiment of a method for toggling between normal cursor mode and cursor path restriction mode.
Figure 3B:
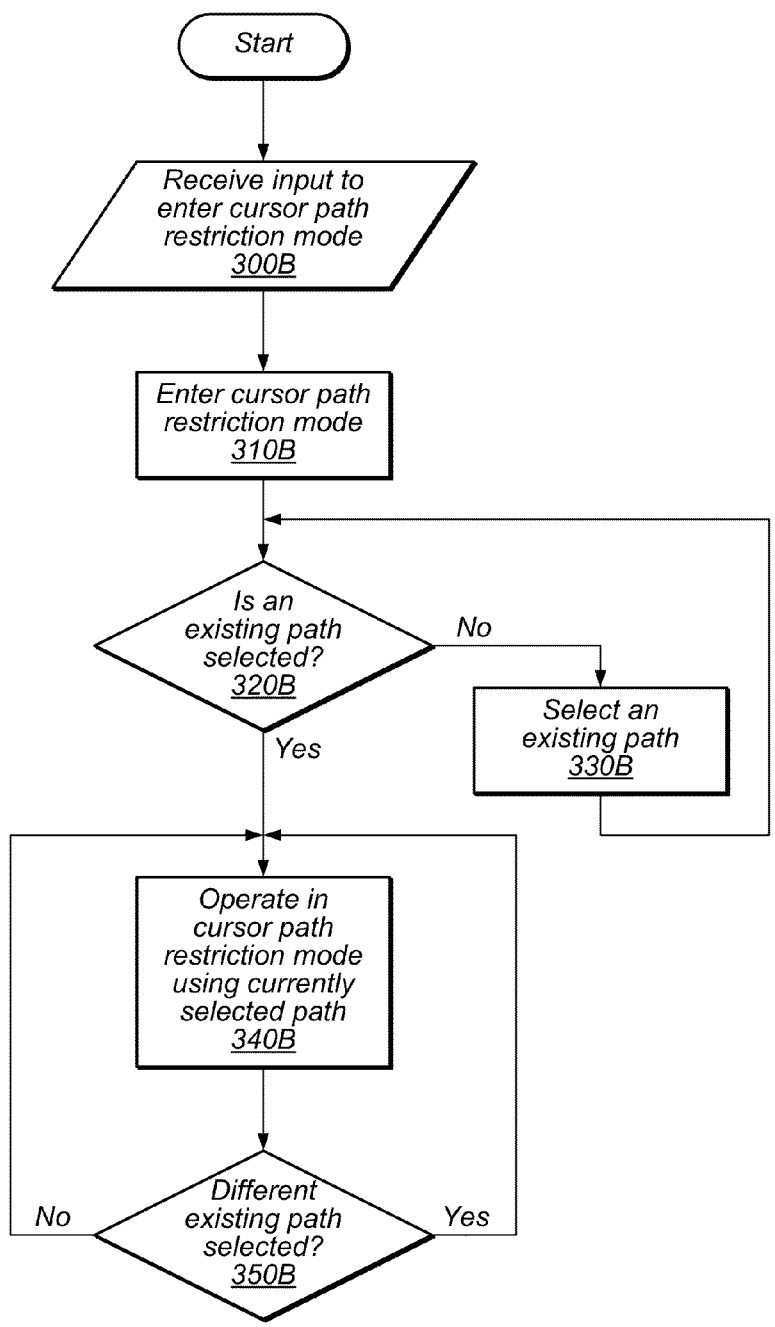
FIG. 3B is a flow diagram illustrating one embodiment of a method for entering a cursor path restriction mode and selecting an existing path.

FIGS. 3A-3B are flow diagrams showing embodiments of various aspects of cursor path restriction mode operations.

FIG. 3A illustrates one embodiment of a method for toggling between normal cursor mode (300A) and cursor path restriction mode (320A). During normal cursor mode operation, cursor path restriction module 25 may receive input signaling a desire or intention to enter cursor path restriction mode (310A). If no input for entering cursor path restriction mode is detected, then operations continue in normal cursor mode (300A). On the other hand, if cursor path restriction module 25 receives a signal to enter cursor path restriction mode, then cursor path restriction module 25 may impose constraints upon the movement of cursor 140 on viewing area 110 of display 100, such that cursor 140 adheres to a restricted path 130 that tracks a currently selected existing path 120, as previously described. At this point, operations begin in cursor path restriction mode (320A) under the control of cursor path restriction module 25. Many kinds of signals may be used to indicate a desire to enter cursor path restriction mode, and the kinds of signals may vary according to numerous embodiments. In various embodiments, a user or a software entity or a hardware component may issue a signal to leave normal cursor mode (300A) and enter cursor path restriction mode (320A). In some embodiments, a user may issue such a signal through a combination of touch, keystrokes, mouse gestures, or other suitable input. For example, a graphic art application may allow a user to actively command entrance into cursor path restriction mode by pressing a particular key on the keyboard. In other instances, a user may trigger entrance into cursor path restriction mode by placing cursor 140 within an envelope surrounding current restricted path 130. In still other embodiments, a signal for entering cursor path restriction mode may be generated without user intervention by an application running in an automated mode, and responding to state variables indicating geometric relationships among the various objects on viewing area 110. For example, an automatic video demonstrating applications of cursor path restriction mode may randomly move cursor 140 on viewing area 110, and may automatically switch to cursor path restriction mode whenever cursor 140 touches a restricted path 130.

Operations may continue in cursor path restriction mode until input to exit cursor path restriction mode is detected (330A). Many kinds of signals may be used to indicate a desire to exit cursor path restriction mode, and the kinds of signals may vary according to numerous embodiments. In various embodiments, a user or a software entity or a hardware component may issue a signal to leave cursor path restriction mode and restore normal cursor operations. In some embodiments, a user may issue such a signal through a combination of touch, keystrokes, mouse gestures, or other suitable input. For example, a graphic art application may allow a user to actively exit cursor path restriction mode by pressing a particular key on the keyboard. In other instances, a user may exit cursor path restriction mode by attempting to move cursor 140 sharply away from restricted path 130. For instance, a user may, in some embodiments, move pointing device 200 to indicate an intention to move cursor 140 in a direction that deviates substantially from the direction of a line tangent to restricted path 130 at or near the point on restricted path 130 where cursor 140 is presently positioned. If the direction of a line tangent to restricted path 130 at or near the point on restricted path 130 where cursor 140 is presently positioned differs by more than a threshold amount from the direction signaled by the user, then cursor path restriction module 25 may relinquish control over cursor 140 and return cursor 140 to a normal cursor mode. Such a threshold amount may be set at 60 degrees, or 80 degrees, or at some other angle. In still other embodiments, a signal for exiting cursor path restriction mode may be generated without user intervention by an application running in an automated mode, and responding to state variables indicating geometric relationships among the various objects on viewing area 110. For example, for an automatic video demonstrating applications of cursor path restriction mode, random spatial inputs 205 may be generated while cursor 140 moves along restricted path 130 in cursor path restriction mode. In the event that the random spatial inputs 205 indicate a direction on viewing area 110 that differs by more than a threshold amount from the direction of a line tangent to restricted path 130 at or near the point on restricted path 130 where cursor 140 is presently positioned, then cursor path restriction module 25 may relinquish control over cursor 140 and return cursor 140 to a normal cursor mode.

FIG. 3B illustrates one embodiment of a method for entering a cursor path restriction mode and selecting an existing path. As described earlier, input signaling entry into cursor path restriction mode may be issued by an operator, a software entity, a hardware component, or by some other means. Cursor path restriction module 25 may receive input to enter cursor path restriction mode (300B), and in response, assume control over cursor 140 such that cursor 140 moves along restricted path 130 under constraints imposed in cursor path restriction mode (310B). Cursor path restriction module 25 may check to determine whether an existing path 120 has been selected for service as a currently selected existing path 120 (320B). If no existing path 120 has been selected, then cursor path restriction module 25 may indicate the need to select an existing path displayed on display 210. In some embodiments, selection of an existing path may be left to a user, and cursor path restriction module 25 may issue a signal to the user that the user should select an existing path 120. In such embodiments, the user may select from one or more existing paths 120. User selection of an existing path 120 may be accomplished by any standard method for selecting an object. For example, the user may select an existing path 120 by drawing a box around a portion of existing path 120, or by placing cursor 140 within a threshold distance of an existing path 120, or by touching an existing path 120, or by any other means for selecting an object.

In other embodiments, selection of an existing path 120 may be made automatically by cursor path restriction module 25 according to preset criteria, or according to the current state of a collection of system variables. For example, cursor path restriction module 25 may refer to a data store indicating the most recently selected existing path 120, and may automatically reselect the most recently selected existing path 120 as the currently selected existing path 120. As another example, cursor path restriction module 25 may refer to a data store indicating a current priority listing of existing paths 120, and may select the one having the highest priority, or the one having the lowest priority. As yet another example, cursor path restriction module 25 may ascertain the state of various objects currently shown on display 210, and may calculate geometric relationships among the various objects as a basis for selecting an existing path 120. For instance, existing paths 120 displayed on display 210 may have different colors, and cursor path restriction module 25 may select the red existing path 120 that is nearest to cursor 140 to serve as the currently selected existing path 120. According to various embodiments, selection of an existing path 120 may be made by any of a wide variety of known methods.

Once an existing path 120 has been selected, then a restricted path 130 may be variously determined, according to the various embodiments, to track a selected existing path 120. FIGS. 1A-1D illustrate some embodiments of a restricted path 130 that tracks a selected existing path 120, and the previous paragraphs describe various embodiments for determining a restricted path 130 that tracks a selected existing path 120. When a restricted path 130 that tracks a selected existing path 120 has been determined, operations proceed in a cursor path restriction mode using a currently selected existing path (340B). Should a different existing path 120 be selected (350B), then operations in cursor path restriction mode are adjusted so that cursor 140 moves along a restricted path 130 that tracks the currently selected different existing path 120.

Figure 3C:
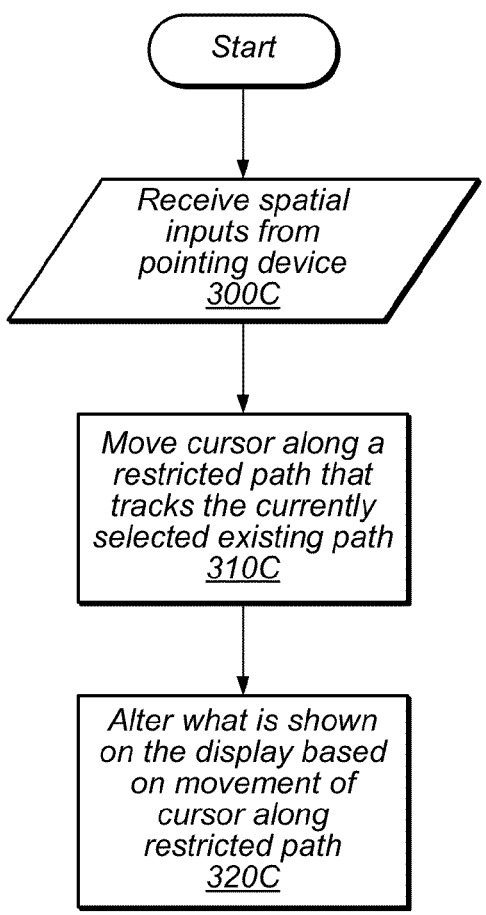
FIG. 3C is a flow diagram illustrating one embodiment of a method for operating in cursor path restriction mode using a currently-selected existing path.

FIG. 3C illustrates one embodiment of a method for operating in cursor path restriction mode using a currently-selected existing path. According to various embodiments, computer system 20 may receive spatial inputs 205 from pointing device 200 (300C). A stream of spatial inputs 205 may include signals indicating positions on viewing area 110 of display 100. While operating in cursor path restriction mode, the stream of spatial inputs 205 issuing from pointing device 200 may be used by cursor path restriction module 25 to determine how cursor 140 moves along restricted path 130. Such determinations of movement of cursor 140 vary according to numerous embodiments. By sending spatial inputs 205 from pointing device 200, cursor 140 may be moved to various positions on restricted path 130. For example, in some embodiments, when spatial inputs 205 signal an intention to move cursor 140 upward on viewing area 110 of display 100, cursor path restriction module 25 may respond by causing cursor 140 to move higher on restricted path 130; if spatial inputs 205 signal an intention to move cursor 140 downward on viewing area 110 of display 100, cursor path restriction module 25 may respond by forcing cursor 140 to move lower on restricted path 130. Similarly, if spatial inputs 205 signal a desire to move cursor 140 rightward on viewing area 110 of display 100, cursor path restriction module 25 may respond by making cursor 140 travel rightward on restricted path 130; if spatial inputs 205 signal a desire to move cursor 140 leftward on viewing area 110, cursor path restriction module 25 may respond by making cursor 140 travel leftward on restricted path 130. As another example, when spatial inputs 205 signal intent to accelerate through locations on viewing area 110 of display 100, cursor path restriction module 25 may compel cursor 140 to accelerate its movement along restricted path 130; if spatial inputs 205 signal intent to decelerate through locations on viewing area 110 of display 100, cursor path restriction module 25 may compel cursor 140 to decelerate its movement along restricted path 130.

While operating in cursor path restriction mode, cursor 140 may move under constraints imposed by cursor path restriction module 25, adhering to a restricted path 130 even when spatial inputs 205 streaming from pointing device 200 indicate an intent to move cursor 140 to a position on viewing area 110 that is not on restricted path 130 (310C). The restricted path 130 followed by cursor 140 may track a selected existing path 120 in various ways, according to numerous embodiments. For example, FIGS. 1A-1D illustrate example embodiments of a restricted path 130 tracking a selected existing path 120. Restricted path 130 may be determined, according to some of the embodiments, as a translation, rotation, or scaled version of selected existing path 120. In some embodiments, restricted path 130 is obtained by a combination of translation, rotation, and scaling of selected existing path 120. Restricted path 130 may be a continuous or a discontinuous path. According to embodiments, cursor path restriction module 25 derives restricted path 130 via a transformation of selected existing path 120, so that restricted path 130 is said to track selected existing path 120. A transformation applied by cursor path restriction module 25 to selected existing path 120 may, in some embodiments, be the identity transformation, such that restricted path 130 coincides exactly with selected existing path 120.

While functioning in cursor path restriction mode, cursor path restriction module 25 may use received spatial inputs 205 to determine how cursor 140 moves along current restricted path 130 on viewing area 110 (310C). The relationship between a received stream of spatial inputs 205 and responsive movement of cursor 140 on current restricted path 130 varies according to various embodiments of cursor path restriction module 25. Several embodiments, each illustrating relationships between a received stream of spatial inputs 205 and responsive movement of cursor 140 on current restricted path 130, are discussed above.

In addition to showing movement of the cursor, an alteration to the content displayed on viewing area 110 of display 100 may be made visible, where the alteration depends on movement of cursor 140 along at least a portion of restricted path 130 (320C). For example, cursor path restriction module 25 may be so configured that, if an operator holds down a button of pointing device 200 while simultaneously moving cursor 140 along a portion of restricted path 130, then cursor path restriction module 25 may respond by applying a colored stroke or pattern to the traversed portion of restricted path 130 while the button is held down by the operator. When the operator releases the button, cursor path restriction module 25 may cease application of the colored stroke or pattern to restricted path 130. There may be considerable variation, according to differing embodiments, of the manner in which cursor path restriction module 25 visibly alters content of viewing area 110 dependent upon movement of cursor 140 along a portion of restricted path 130. A further discussion of various types of alterations is given below, and several example embodiments are illustrated in FIGS. 4-8.

FIGS. 4-8 illustrate embodiments where, in addition to showing movement of the cursor, an altering of the content displayed on viewing area 110 of display 100 is revealed, where the altering depends on movement of cursor 140 along at least a portion of restricted path 130 under constraints applied during cursor path restriction mode.

Figure 4:
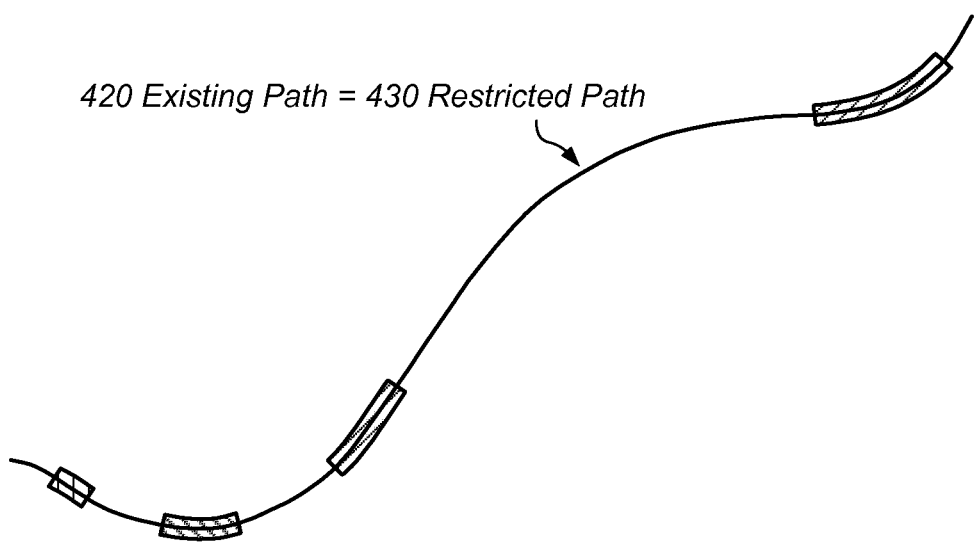
FIG. 4 depicts an embodiment in which an existing path coincides with a restricted path which tracks the existing path. An embodiment of alterations made to the display content, dependent upon movement of the cursor along portions of the restricted path, is also shown.

In the example embodiment illustrated in FIG. 4, existing path 420 and restricted path 430 are exactly coincident. Cursor 140 moves along restricted path 430 in cursor path restriction mode, in response to spatial inputs 205 received from pointing device 200. During time intervals in which cursor 140 moves along particular portions of restricted path 430, strokes or patterns may be applied dependent upon movement of cursor 140 along the particular portions of restricted path 430. Strokes or patterns are shown in FIG. 4 centered on four non-contiguous portions of restricted path 430. The strokes or patterns centered on the four non-contiguous portions of restricted path 430 may be generated in response, for example, to a user holding down a button of pointing device 200 and simultaneously, by means of manipulating pointing device 200, causing cursor 140 to proceed along the four non-contiguous portions of restricted path 430. A stroke or a pattern is applied to the portions of restricted path 430 traversed by cursor 140 while the user holds down the button of pointing device 200. It is intended that such a user may, according to various embodiments, choose different strokes or patterns or other visible effects to be applied while traversing restricted path 430. It is noted that such visible effects, applied dependent upon movement of cursor 140 along restricted path 430 in cursor path restriction mode, may not necessarily be centered on restricted path 430, as shown in FIG. 4. In fact, according to some embodiments, such visible effects may be displayed off-center or away from restricted path 430. According to still other embodiments, such visible effects may curve away from restricted path 430, subject to deformation by a transforming function.

Figure 5:
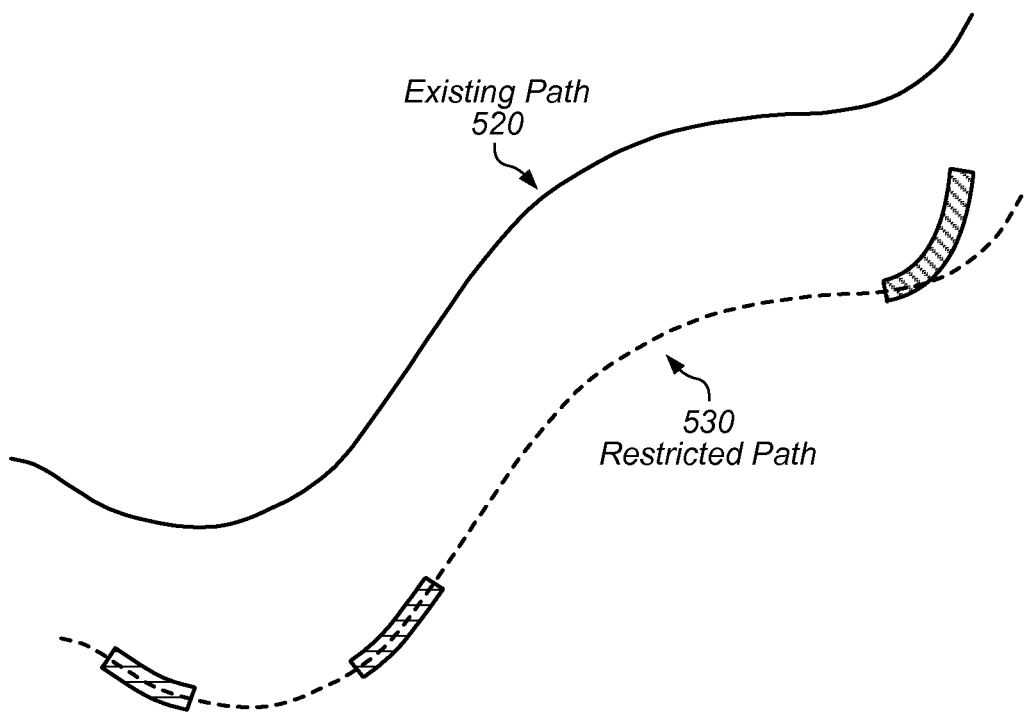
FIG. 5 depicts an embodiment in which a restricted path which tracks an existing path is a translation of the existing path. An embodiment of alterations made to the display content, dependent upon movement of the cursor along portions of the restricted path, is also shown.

In the example embodiment illustrated in FIG. 5, restricted path 530 is a translation of existing path 520 across viewing area 110. During time intervals in which cursor 140 moves along particular portions of restricted path 530, strokes or patterns may be applied dependent upon movement of cursor 140 along the particular portions of restricted path 530. Strokes or patterns are shown in FIG. 5 at three non-contiguous portions of restricted path 530. The strokes or patterns at the three non-contiguous portions of restricted path 530 may be generated in response, for example, to a user holding down a button of pointing device 200 and simultaneously manipulating pointing device 200 to make cursor 140 proceed along the three non-contiguous portions of restricted path 530. A stroke or a pattern is applied at portions of restricted path 530 traversed by cursor 140 while the user holds down the button of pointing device 200. It is intended that such a user may, according to various embodiments, choose different strokes or patterns or other visible effects to be applied while traversing restricted path 530. It is noted that such visible effects, applied dependent upon movement of cursor 140 along restricted path 530 in cursor path restriction mode, may not necessarily be centered on restricted path 530. FIG. 5 shows two strokes that are approximately centered on restricted path 530. A third stroke does not fully conform to restricted path 530. Instead, the third stroke is deformed by a transforming function so that it curves away from the portion of restricted path 530 traversed by cursor 140 during generation of the third stroke. In some embodiments, such a deformation of a stroke or a pattern may be requested by a user or by a software component or a hardware component. In other embodiments, a transforming function may be incorporated into a stroke or a pattern so that it is automatically applied when the stroke or pattern is applied.

Figure 6:
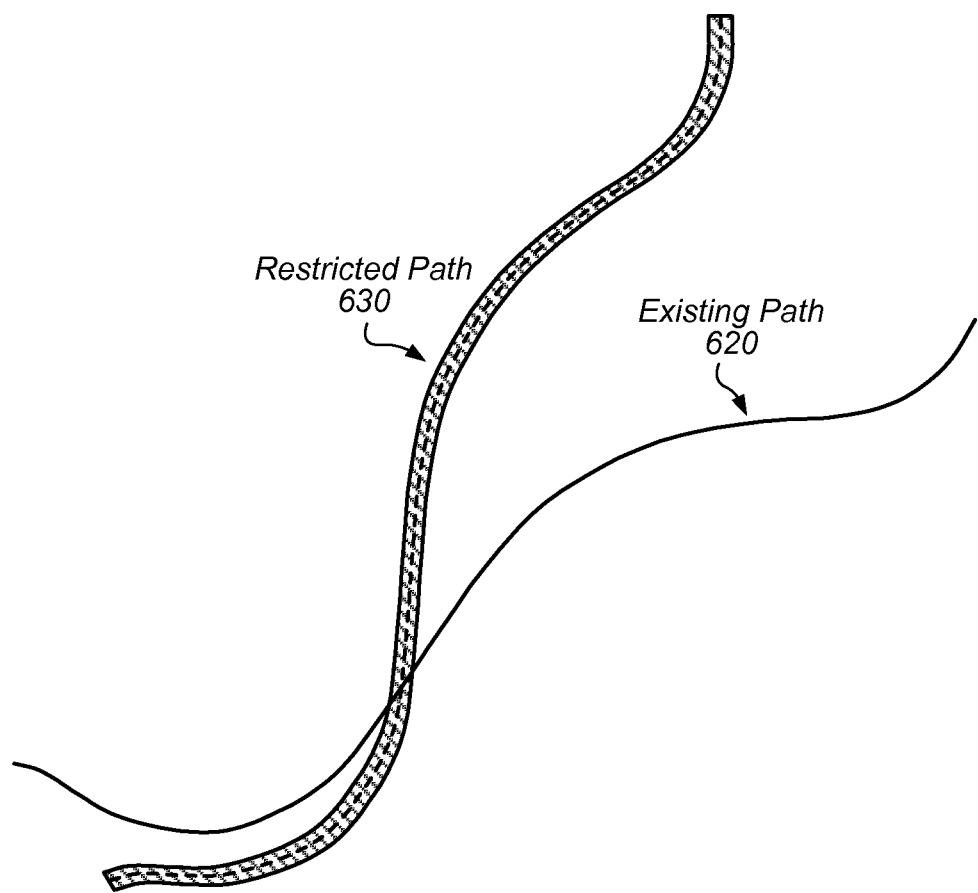
FIG. 6 depicts an embodiment in which a restricted path tracking an existing path is a rotation and translation of the existing path. An embodiment of alterations made to the display content, dependent upon movement of the cursor along portions of the restricted path, is also shown.

In the example embodiment illustrated in FIG. 6, restricted path 630 is a rotation and translation of existing path 620 across viewing area 110. During time intervals in which cursor 140 moves along particular portions of restricted path 630, strokes or patterns may be applied dependent upon movement of cursor 140 along the particular portions of restricted path 630. FIG. 6 shows a single stroke applied to restricted path 630 and centered on restricted path 630. Such a stroke may be generated by a user who generates a stroke-painting signal while simultaneously manipulating pointing device 200 to make cursor 140 proceed along the entire length of restricted path 630. According to various embodiments, such a user may choose several strokes or patterns or other visible effects to be applied while traversing restricted path 630. In the illustrated embodiment, the user has chosen a single stroke for application directly on restricted path 630. Visible effects applied dependent upon movement of cursor 140 along restricted path 630 in cursor path restriction mode may not necessarily be centered on, or even touch, restricted path 630. For example, the stroke shown in FIG. 6 may be shifted on or away from restricted path 630 according to a transforming function applied to the stroke, or may otherwise be deformed so that it does not conform to restricted path 630. In some embodiments, such a deformation of a stroke or a pattern may be requested by a user or by a software component or a hardware component. In other embodiments, a transforming function may be incorporated into a stroke or a pattern so that it is automatically applied when the stroke or pattern is applied.

Figure 7:
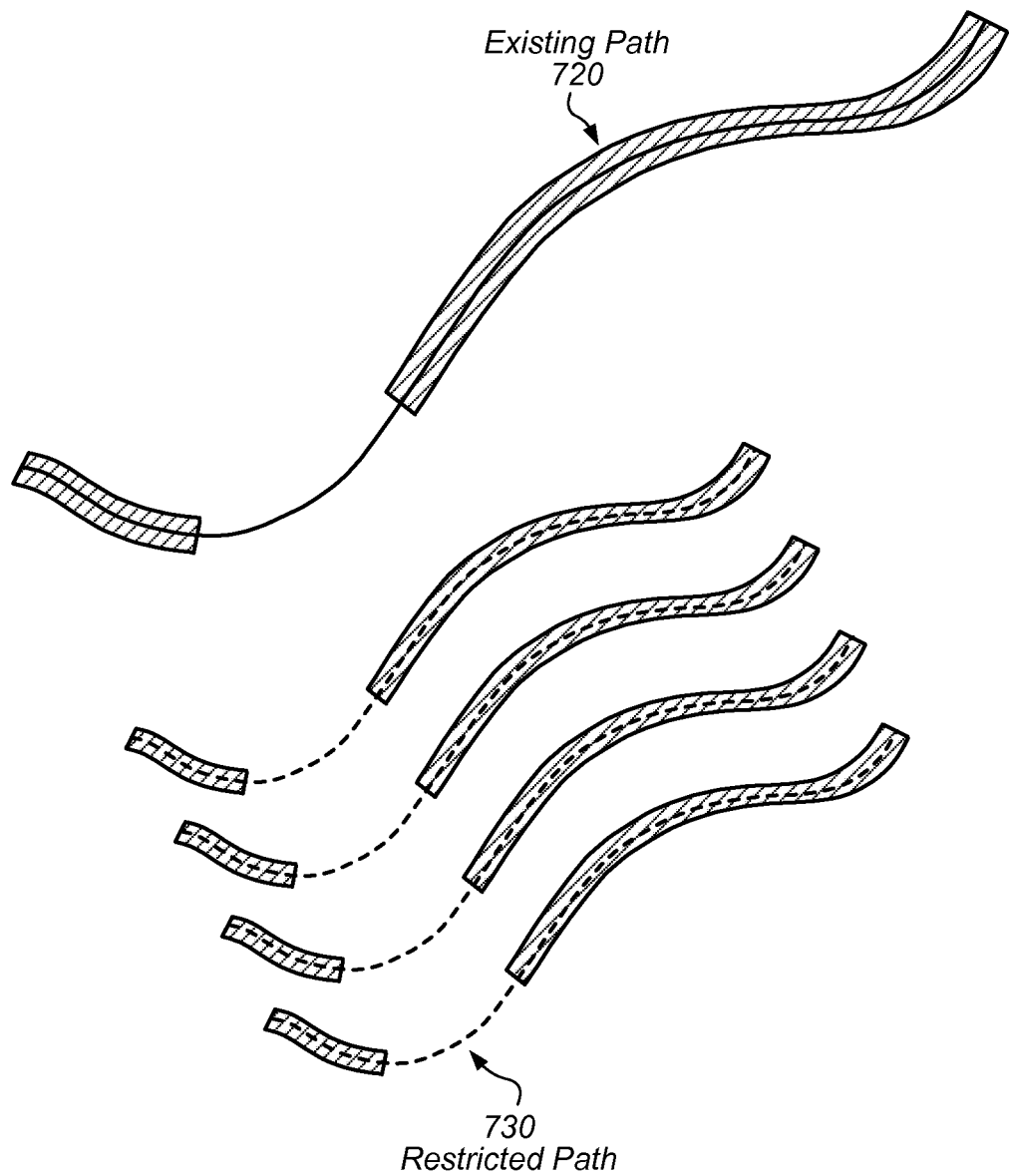
FIG. 7 depicts an embodiment in which a restricted path tracking an existing path is a rotated, translated, and scaled version of the existing path. An embodiment of alterations made to the display content, dependent upon movement of the cursor along portions of the restricted path, is also shown.

The example embodiment illustrated in FIG. 7 shows restricted path 730 as a rotated, translated, and scaled version of existing path 720 on viewing area 110. During time intervals in which cursor 140 moves along particular portions of restricted path 730, strokes or patterns may be applied dependent upon movement of cursor 140 along the particular portions of restricted path 730. FIG. 7 shows strokes or patterns centered along two non-contiguous portions of restricted path 730, along with three clones of restricted path 730 and of the strokes or patterns applied to restricted path 730. Such strokes or patterns or other visual effects may be generated by a user who issues a signal to apply a visual effect while simultaneously manipulating pointing device 200 to make cursor 140 proceed along the two non-contiguous portions of restricted path 730. The three cloned stroke pairings shown in FIG. 3 may be automatically generated to appear simultaneously with the pair of strokes applied to restricted path 730. Such cloning or copying of visible effects applied dependent upon movement of cursor 140 along portions of restricted path 730 may be specified according to various parameters, depending on the embodiments. For example, one parameter may specify the number of clones to be generated, while another parameter may set a distance between individual copies of the visible effects.

Figure 8:
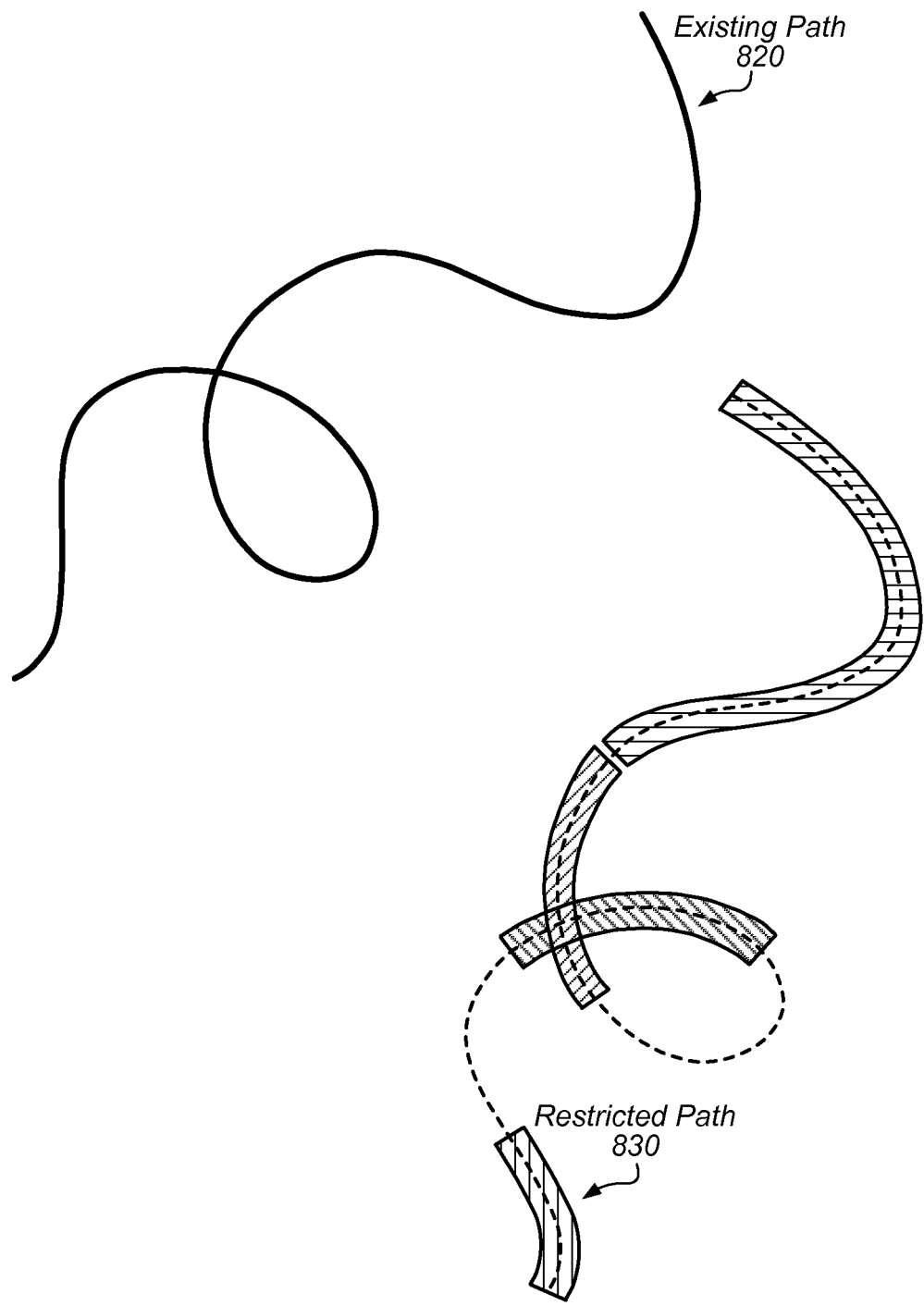
FIG. 8 depicts an embodiment in which a restricted path tracking an existing path is a rotation and translation of the existing path. An embodiment of alterations made to the display content, dependent upon movement of the cursor along portions of the restricted path, is also shown.

FIG. 8 shows an example embodiment in which restricted path 830 tracks existing path 820 as a rotation and translation of existing path 820 on viewing area 110. During time intervals in which cursor 140 moves along particular portions of restricted path 830, strokes or patterns may be applied dependent upon movement of cursor 140 along the particular portions of restricted path 830. FIG. 8 shows four strokes or patterns centered along four portions of restricted path 830. Such strokes or patterns or other visual effects may be generated by a user who issues a signal to apply a visual effect while simultaneously manipulating pointing device 200 to make cursor 140 proceed along the four portions of restricted path 830. Since restricted path 830 loops over itself, it provides an example in which visual effects that are applied while cursor 140 traverses two segments of restricted path 830 may overlap each other. As mentioned previously, visible effects applied dependent upon movement of cursor 140 along restricted path 830 in cursor path restriction mode may not necessarily be centered on, or even touch, restricted path 830. For example, a stroke shown in FIG. 8 may be shifted on or away from restricted path 830 according to a transforming function applied to the stroke, or may otherwise be deformed so that it does not conform to restricted path 830. In some embodiments, such a deformation of a stroke or a pattern or a visual effect may be requested by a user or by a software component or a hardware component. In other embodiments, a transforming function may be incorporated into a stroke or a pattern or visual effect so that it is automatically applied when the stroke or pattern or visual effect is applied.

It is noted that in the embodiment illustrated in FIG. 8, existing path 820 crosses over itself at a point of intersection to form an intersection having four branches, as does restricted path 830, which tracks existing path 820. While cursor 140 is moving along restricted path 830 in cursor path restriction mode, and as cursor 140 approaches the point of intersection, one of the four branches may be selected as the intended branch for continued movement of cursor 140 along restricted path 830. For each of the four branches, the slope of a line tangent to the branch at or near the point of intersection may be calculated. Each of the four calculated slopes may be compared with the slope of a vector representing an intended direction of movement of cursor 140, as indicated by spatial inputs 205. Based on the results of the comparison, and the direction of the vector, one of the four branches may be selected for cursor 140 to track as it continues along restricted path 830 in cursor path restriction mode. Similar calculations and selections may be made for other embodiments in which the number of branches is not four. For instance, an existing path 820 may have only three branches extending from a point of intersection, as in the case of a Y-shaped existing path 820, and similar calculations may be made for the three branches.

The application of strokes or patterns or other visual effects may depend upon movement of cursor 140 along particular portions of restricted path 130 while in cursor path restriction mode. For instance, any one of the four strokes shown in FIG. 4 may be removed or partially erased while cursor 140 traverses a corresponding portion of restricted path 430 in cursor path restriction mode. Alternatively, any one of the four strokes shown in FIG. 4 may be replaced with some other visual effect, if required, based upon movement of cursor 140 along a corresponding portion of restricted path 430 in cursor path restriction mode. According to some embodiments, any one of the four strokes shown in FIG. 4 may be blended or joined or otherwise mixed with another visual effect, based upon movement of cursor 140 along a corresponding portion of restricted path 430 in cursor path restriction mode.

According to some other embodiments, new visual effects applied to portions of viewing area 110 that are not on existing path 120 may be derived from existing visual effects already present on existing path 120. For example, existing path 820 shown in FIG. 8 may already have several visual effects centered upon it (this is not shown in the drawing), and the four strokes exhibited in FIG. 8 may be produced by extracting them from the several existing visual effects centered on existing path 820. In some embodiments, such an extraction may be accomplished by simply holding down a button while cursor 140 traverses the four corresponding portions of restricted path 830 in cursor path restriction mode. In other embodiments, new visual effects applied to portions of viewing area 110 that are not on existing path 120 may be generated in other ways. For example, they may be gotten from existing visual effects already present on portions existing path 120 by blending or otherwise modifying existing visual effects already present on portions of existing path 120. In such an example embodiment, the derivation and the application of the modified visual effects is based upon movement of cursor 140 along portions of restricted path 130 that correspond to the portions of existing path 120 where the existing visual effects are located, with the derivation and application proceeding while cursor 140 moves on restricted path 130 in cursor path restriction mode.

In the embodiment illustrated in FIG. 7, a pair of strokes is shown centered along two non-contiguous portions of existing path 720. The other four pairs of strokes which are located elsewhere on viewing area 110 may, according to some embodiments, be viewed as visible copies of the pair of strokes on existing path 720. They may be generated and applied based upon movement of cursor 140 along portions of restricted path 730 that correspond to the portions of existing path 720 where the original pair of strokes are centered, with the derivation and application proceeding while cursor 140 moves in cursor path restriction mode. These visible copies are rotated, translated, and scaled on viewing area 110 of display 100.

According to some embodiments, an existing path 120 may be derived from a raster image using edge detection. In such instances, after an existing path 120 has been obtained from the raster image, cursor 140 may begin operating in cursor path restriction mode relative to existing path 120, and thus cursor 140 may be forced to precisely track existing path 120. In this manner, a bitmap brush being applied to the raster image may be guided with precision relative to an edge of the raster image. During movement of cursor 140 along a restricted path 130 that tracks existing path 120, the bitmap brush may apply a change to a portion of the raster image that matches restricted path 130.

Numerous parameters used for cursor path restriction mode are described above. Those parameters, as well as other parameters for cursor path restriction mode operations may be presented, according to some embodiments, in a user interface for viewing, entering, selecting, or changing cursor path restriction mode parameters. Example parameters include ones for: controlling cursor acceleration and deceleration; defining a degree of rotation, an amount of translation, or a scaling factor to apply to a selected existing path in determining a restricted path; exiting and entering cursor path restriction mode; defining a threshold angle or slope used in exiting cursor path restriction mode; defining a threshold distance from an existing path for selection of the existing path; defining a threshold amount used in resolving a difference between anticipated cursor movement and desired cursor movement; establishing the width of an envelope straddling a path; defining a metric for use in calculations made by a cursor path restriction module; specifying a number of clones to be generated, or some other repetition count; setting a distance between individual copies of paths, strokes, patterns, or other visible effects; and configuring and controlling the application of strokes, patterns, and other visual effects.

Conduct of various operations in cursor path restriction mode provides efficiency and ease in performing those operations. For example, operations that may otherwise require many separate steps, numerous switches between modes, or division of paths may be performed easily and quickly in a single pass in cursor path restriction mode, without the necessity for making many separate steps, frequent switching between modes, or dividing of paths into pieces. A user may apply various brush strokes, patterns, or other varied visual effects continually, without ever leaving cursor path restriction mode. Instead of having to separately select a portion of a path, copy the selected portion, apply visual effects to the selected portion, and paste the altered copy, one may combine all these steps using cursor path restriction mode. Rather than having to apply a sequence of operations for each of several non-contiguous portions of a path, one may apply a single operation per non-contiguous portion of a path, and may apply the single operations serially without leaving cursor path restriction mode. Operations may be applied for just a portion of a path, if desired. Resizing and transforming of paths is accomplished with ease, as is varying the visual effects being applied, all while operating continually in cursor path restriction mode.

Cursor path restriction mode also offers complete precision in performing operations that depend on accurately tracking a path. Errors made with the pointing device in attempting to track an existing path may be eliminated by using cursor path restriction mode. Visual effects derived using an existing path may be accurately generated and placed on the display so that important shape or other geometric or visual characteristics or effects inherent on an existing path are faithfully preserved. Visual effects thus derived from an existing path may be correctly applied either to the existing path itself or to other portions of the display, as described above.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for applying a mode that restricts cursor movement to track an existing path, as described above with respect to FIGS. 1-8. In particular, cursor path restriction module 25 or any partition of its functionality may be implemented as such instructions. Such instructions may be executed to perform a particular computational function, such as generating, sending, or receiving a message, to implement mathematical functions such as integration, differentiation, convolution, etc., as well as to implement higher-order functions such as operating system functionality, network communications functionality, application functionality, and/or any other suitable functions.

Figure 9:
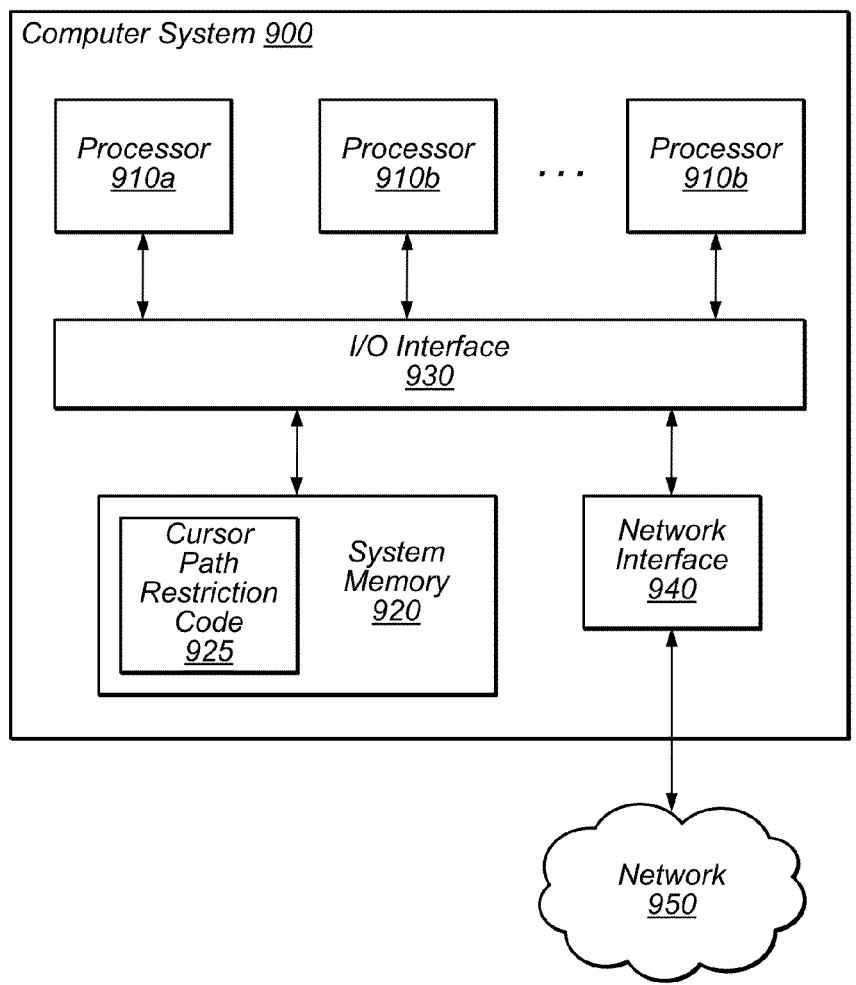
FIG. 9 is a block diagram illustrating an embodiment of a computer system.

One exemplary embodiment of a computer system including tangible, computer-accessible storage media is illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. In different embodiments, system 900 may be variously configured as a server system, a desktop or notebook system, an embedded system, a handheld or portable client system, etc. In various embodiments, computer system 900 may be representative of computer system 10 of FIG. 1 or of components illustrated in FIG. 2, including computer system 20, cursor path restriction module 25, pointing device 200, spatial inputs 205, display inputs 215, and display 210.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as cursor path restriction code 925. It is noted that in some embodiments, cursor path restriction code 925 may include instructions and data implementing desired functions that are not directly executable by processor 910 but are represented or encoded in an abstract form that is translatable to instructions that are directly executable by processor 910. For example, cursor path restriction code 925 may include instructions specified in an ISA that may be emulated by processor 910, or by other code executable on processor 910. Alternatively, cursor path restriction code 925 may include instructions, procedures or statements implemented in an abstract programming language that may be compiled or interpreted in the course of execution. As non-limiting examples, cursor path restriction code 925 may include code specified in a procedural or object-oriented programming language such as C or C++, a scripting language such as Perl or Ruby or Python, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 950, such as other computer systems or communications devices, for example. In particular, network interface 940 may be configured to allow communication between computer system 900 and various external devices. These external devices may include various computing and communications devices, which may include elements similar to those of computer system 900. In particular, the external devices may include personal computers, telephony devices or network-attached computing devices that users may employ to access network services. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. A computer-accessible medium may generally be accessible via transmission media or signals such as electrical, electromagnetic, or digital signals, which may be conveyed via a communication medium such as a network and/or a wireless link, such as may be accessed via network interface 940.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
    receiving input to enter a cursor path restriction mode; and while in the cursor path restriction mode:
    determining an existing path to associate with the cursor path restriction mode, the cursor path restriction mode restricting movement of a cursor to a restricted path associated with the existing path;
    receiving spatial inputs from a pointing device configured to control the cursor on a display, wherein the spatial inputs signal positions on the display;
    moving the cursor in response to the received spatial inputs so that the cursor moves on the restricted path that tracks the existing path displayed on the display, such that whenever the spatial inputs signal a position not on the restricted path, movement of the cursor remains confined to the restricted path; and
    during said moving, in addition to showing movement of the cursor, altering what is displayed on the display, wherein said altering is dependent upon movement of the cursor along at least a portion of the restricted path.

2. The method of claim 1, wherein the restricted path is the existing path, and said altering comprises changing one or more portions of the display of the existing path while the cursor tracks the existing path during said moving.

3. The method of claim 1, wherein said altering comprises applying one or more strokes or patterns to the display of one or more portions of the existing path.

4. The method of claim 1, wherein said altering is applied to non-contiguous portions of the display, wherein said non-contiguous portions of the display are defined by additional input received as the cursor moves on corresponding non-contiguous portions of the restricted path, and wherein a shape of each non-contiguous portion of the display corresponds to a shape of its corresponding non-contiguous portion of the restricted path.

5. The method of claim 1, wherein said altering comprises one or more of adding to, appending to, blending with, replacing, or removing a stroke or a pattern located on one or more displayed portions of the existing path.

6. The method of claim 1, wherein said altering comprises generating a visible copy of one or more portions of the existing path at another position on the display, or at several other positions on the display.

7. The method of claim 6, wherein the visible copy is rotated or scaled on the display.

8. The method of claim 1, wherein the existing path is generated from a raster image using edge detection, and said altering applies a change to a matching portion of the raster image.

9. The method of claim 1, further comprising receiving input to exit said cursor path restriction mode and return to a normal cursor mode, wherein during said normal cursor mode, movement of the cursor is defined by the spatial inputs.

10. The method of claim 9, wherein the input to exit said cursor path restriction mode comprises detecting spatial inputs from the pointing device that indicate desired movement of the cursor at a slope deviating from the restricted path by a threshold amount.

11. The method of claim 1, wherein the existing path crosses over itself at a point of intersection to form an intersection having at least three branches, the method further comprising, during said moving, selecting one of the branches for the cursor to track, wherein said selecting is based on a slope of an intended direction of movement of the cursor on the display, as indicated by the spatial inputs, and on slopes of lines of tangency of each of the branches.

12. The method of claim 1, further comprising, prior to moving the cursor on the restricted path, selecting said existing path from among a plurality of existing paths displayed on the display.

13. A system, comprising:
    a processor; and
    a memory coupled to the processor, wherein the memory stores program instructions executable by the processor to implement a cursor path restriction module configured to perform:
    receiving input to enter a cursor path restriction mode; and while in the cursor path restriction mode:
    determining an existing path to associate with the cursor path restriction mode, the cursor path restriction mode restricting movement of a cursor to a restricted path associated with the existing path;
    receiving spatial inputs from a pointing device configured to control the cursor on a display, wherein the spatial inputs signal positions on the display;
    moving the cursor in response to the received spatial inputs so that the cursor moves on the restricted path that tracks an existing path displayed on the display, such that whenever the spatial inputs signal a position not on the restricted path, movement of the cursor remains confined to the restricted path; and
    during said moving, in addition to showing movement of the cursor, altering what is displayed on the display, wherein said altering is dependent upon movement of the cursor along at least a portion of the restricted path.

14. The system of claim 13, wherein said altering is applied to non-contiguous portions of the display, wherein said non-contiguous portions of the display are defined by additional input received as the cursor moves on corresponding non-contiguous portions of the restricted path, and wherein a shape of each non-contiguous portion of the display corresponds to a shape of its corresponding non-contiguous portion of the restricted path.

15. A computer-readable memory device storing program instructions, wherein the program instructions are computer-executable to perform:
- receiving input to enter a cursor path restriction mode; and while in the cursor path restriction mode:
- determining an existing path to associate with the cursor path restriction mode, the cursor path restriction mode restricting movement of a cursor to a restricted path associated with the existing path;
- receiving spatial inputs from a pointing device configured to control the cursor on a display, wherein the spatial inputs signal positions on the display;
- moving the cursor in response to the received spatial inputs so that the cursor moves on the restricted path that tracks an existing path displayed on the display, such that whenever the spatial inputs signal a position not on the restricted path, movement of the cursor remains confined to the restricted path; and
- during said moving, in addition to showing movement of the cursor, altering what is displayed on the display, wherein said altering is dependent upon movement of the cursor along at least a portion of the restricted path.

16. The computer-readable memory device of claim 15, wherein the restricted path is the existing path, and said altering comprises changing one or more portions of the display of the existing path while the cursor tracks the existing path during said moving.

17. The computer-readable memory device of claim 15, wherein said altering is applied to non-contiguous portions of the display, wherein said non-contiguous portions of the display are defined by additional input received as the cursor moves on corresponding non-contiguous portions of the restricted path, and wherein a shape of each non-contiguous portion of the display corresponds to a shape of its corresponding non-contiguous portion of the restricted path.

18. The computer-readable memory device of claim 15, wherein said altering comprises generating a visible copy of one or more portions of the existing path at another position on the display, or at several other positions on the display.

19. The computer-readable memory device of claim 15, wherein the existing path crosses over itself at a point of intersection to form an intersection having at least three branches, the method further comprising, during said moving, selecting one of the branches for the cursor to track, wherein said selecting is based on a slope of an intended direction of movement of the cursor on the display, as indicated by the spatial inputs, and on slopes of lines of tangency of each of the branches.

20. The computer-readable memory device of claim 15, further comprising, prior to moving the cursor on the restricted path, selecting said existing path from among a plurality of existing paths displayed on the display.

* * * * *

UNITED STATES PATENT AND TRADEMARK OFFICE
CERTIFICATE OF CORRECTION

| | | |
|---|---|---|
| PATENT NO. | : 8,743,053 B2 | Page 1 of 1 |
| APPLICATION NO. | : 12/550871 | |
| DATED | : June 3, 2014 | |
| INVENTOR(S) | : Gilra et al. | |

It is certified that error appears in the above-identified patent and that said Letters Patent is hereby corrected as shown below:

On the title page item [73], after "Adobe Systems" delete "Incorporation", insert -- Incorporated --, therefor.

Signed and Sealed this
Ninth Day of September, 2014

Michelle K. Lee
*Deputy Director of the United States Patent and Trademark Office*